(12) United States Patent
Nair (10) Patent No.: US 10,629,203 B2
(45) Date of Patent: Apr. 21, 2020

(54) METHOD AND SYSTEMS FOR BOOKMARKING COMPLEX COMMANDS USING VOICE

(71) Applicant: Flex Ltd., Singapore (SG)

(72) Inventor: Anoop Krishnan Nair, Allen, TX (US)

(73) Assignee: Flex, Ltd., Singapore (SG)

( * ) Notice: Subject to any disclaimer, the term of this patent is extended or adjusted under 35 U.S.C. 154(b) by 0 days.

(21) Appl. No.: 16/023,123

(22) Filed: Jun. 29, 2018

(65) Prior Publication Data

US 2019/0318734 A1    Oct. 17, 2019

Related U.S. Application Data

(60) Provisional application No. 62/659,117, filed on Apr. 17, 2018.

(51) Int. Cl.
| | | |
|---|---|---|
| *G10L 15/00* | (2013.01) | |
| *G10L 15/22* | (2006.01) | |
| *G10L 15/30* | (2013.01) | |
| *G10L 15/08* | (2006.01) | |

(52) U.S. Cl.
CPC .............. *G10L 15/22* (2013.01); *G10L 15/08* (2013.01); *G10L 15/30* (2013.01); *G10L 2015/088* (2013.01); *G10L 2015/223* (2013.01)

(58) Field of Classification Search
CPC combination set(s) only.
See application file for complete search history.

(56) References Cited

U.S. PATENT DOCUMENTS

| | | | |
|---|---|---|---|
| 2016/0078864 A1* | 3/2016 | Palanisamy | G10L 15/08 704/235 |
| 2018/0321905 A1* | 11/2018 | Fountaine | G06F 3/167 |
| 2019/0102145 A1* | 4/2019 | Wilberding | G06F 3/04817 |

* cited by examiner

*Primary Examiner* — Vu B Hang
(74) *Attorney, Agent, or Firm* — Sheridan Ross P.C.

(57) ABSTRACT

Voice information is received, via a network from a first voice assistant. The voice information comprises a digitized voice stream and/or information associated with the digitized voice stream. A keyword is identified in the voice information. The keyword is used to create a first bookmark. In response to identifying the first keyword in the voice information, a name for the first bookmark is received in the voice information, a command for the first bookmark is received in the voice information; and the bookmark is stored in a memory.

15 Claims, 4 Drawing Sheets

METHOD AND SYSTEMS FOR BOOKMARKING COMPLEX COMMANDS USING VOICE

CROSS REFERENCE TO RELATED APPLICATION

The present application claims the benefits of and priority under 35 U.S.C. § 119(e) to U.S. Provisional Application Ser. No. 62/659,117, filed on Apr. 17, 2018, entitled "METHOD AND SYSTEMS FOR BOOKMARKING COMPLEX COMMANDS USING VOICE." The entire disclosure of the application listed above is hereby incorporated by reference, in its entirety, for all that it teaches and for all purposes.

FIELD

The present disclosure is generally directed to voice assistants, in particular, toward creating bookmarks for voice assistants.

BACKGROUND

Voice assistants, such as Amazon's Alexa™, are becoming pervasive in the home with estimates at about thirty million American homes owning a voice assistant by the end of 2017. Though voice assistants can process simple commands, they still struggle to understand the context of requests and several exchanges are sometimes needed with the user to provide the needed information. It will take significant time for voice assistant's artificial intelligence to become context aware and accurately piece together the information needed to execute a command. Till then, the voice assistants will continue to gather context by using descriptive command arguments or using multiple prompts to retrieve the context from user. The current process of gathering context is not an ideal user interface as the user must remember all the arguments for a command or must answer multiple prompts even to generate a simple command.

DETAILED DESCRIPTION

Figure 1:
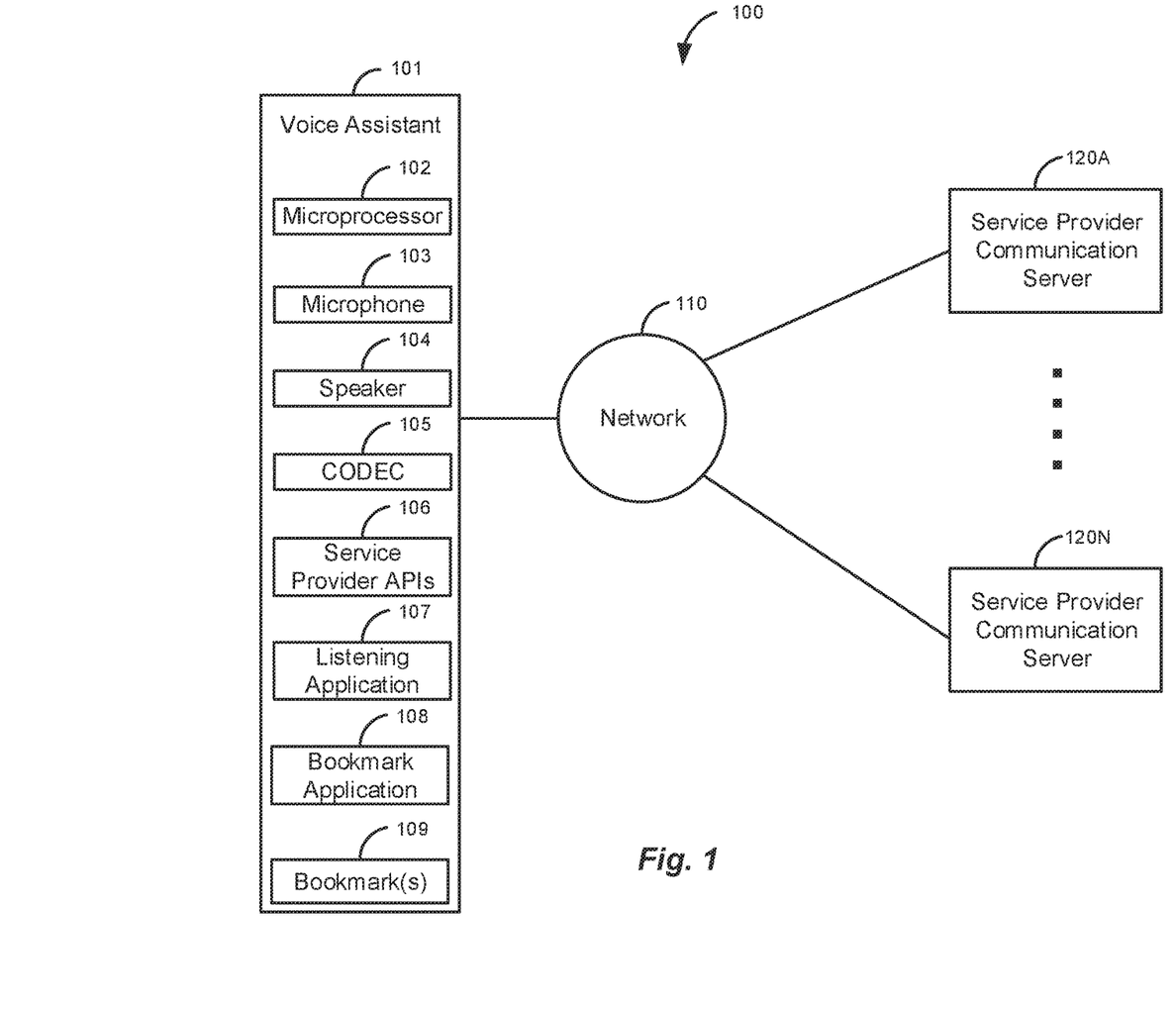
FIG. 1 is a block diagram of a first illustrative system for bookmarking complex voice commands.

FIG. 1 is a block diagram of a first illustrative system 100 for bookmarking complex voice commands. The first illustrative system 100 comprises a voice assistant 101, a network 110, and service provider communication servers 120A-120N. The voice assistant 101 can be or may include any user device that can send and receive voice information on the network 110, such as a Personal Computer (PC), a self-contained voice assistant 101, a telephone, a personal home assistant, a tablet device, and/or the like. In FIG. 1, only a single voice assistant 101 is shown for simplicity. However, any number of voice assistants 101 may be connected to the network 101.

The voice assistant 101 further comprises a microprocessor 102, a microphone 103, a speaker 104, a coder/encoder (codec) 105, service provider Application Programming Interfaces (APIs) 106, a listening application 107, a bookmark application 108, and one or more bookmarks 109. The microprocessor 102 can be or may or can include any known microprocessor 102, such as a microcontroller, an application specific microprocessor 102, a digital signaling processor, a multi-core processor, and/or the like.

The microphone 103 can be or may include any type of microphone, such as dynamic microphone, a cardioid microphone, a super/hyper cardioid microphone, an omnidirectional microphone, a pattern microphone, a diaphragm size microphone, a condenser microphone, a ribbon microphone, and/or the like.

The speaker 104 can be or may any type of speaker, such as an electrodynamic loud speaker, a flat panel speaker, a planar speaker, a multi-cell diaphragm speaker, a headphone, a plasma arc speaker, piezoelectric speaker, a plurality of speakers (e.g., a woofer, a mid-range, and a tweeter) and/or the like.

The codec 105 can be any coder/encoder that can take an analog signal from the microphone 103 and turn the analog signal into a digitized voice stream. The codec 105 can also take a digitized voice stream and convert the digitized voice stream to an analog signal that is sent to the speaker 104. The codec 105 includes an analog to digital converter. The codec 105 can be or may include a linear pulse code modulation codec, a pulse density modulation codec, a direct stream digital codec, a pulse amplitude modulation codec, free lossless audio codec, and/or the like.

The service provider Application Programming Interfaces (APIs) 106 can be or may include any API that is provided by a service provider that allows access to services provided by a service provider communication server 120. The service provider APIs 106 may work in a variety of ways. For example, the service provider APIs 106 may establish a voice communication session (using data sent and received by the codec 105) between the voice assistant 101 and the service provider communication server 120. Alternatively, the service provider APIs 106 may allow the voice assistant 101 to communicate with the service provider communication server 120 using text. For example, the voice assistant 101 may convert the digitized audio signal from the codec 105 to text and communicate with the service provider communication server 120 using text. Likewise, the service provider communication server 120 may respond back using text.

The listening application 107 can be or may include any software that can provide an interface between the codec 105 and the service provider APIs 106. The listening application 107 can communicate with the service provider communication servers 120A-120N to receive services based on voice input.

The bookmark application 108 can be or may include any software coupled with hardware that can be used to create the bookmarks 109. The bookmark application 108 works in conjunction with the listening application 107 (e.g., by monitoring or inserting itself into a voice communication session between the voice assistant 101 and the service provider communication server 120.

The bookmark(s) 109 are bookmarks 107 of user commands. The bookmark(s) 109 comprises a name of the bookmark and one or more commands associated with the bookmark 109. The bookmark(s) 109 are typically stored in a memory of the voice assistant 101 (e.g., a hard disk or solid-state memory). The bookmark(s) 109 are specific to the voice assistant 101. For example, the bookmark(s) 109 are bookmark(s) 109 created by one or more users of the voice assistant 101.

A bookmark 109 may also be specific to a user. For example, the bookmark application 108 may use voice or facial recognition (or the user stating his/her name) to identify the user when creating and storing a bookmark 109. In this embodiment, only the same user may execute the bookmark 109. In addition, in this embodiment, the bookmark 109 may have a user identifier.

The bookmark(s) 109 may be specific to a service provider. For example, a bookmark 109 may only be sent to the service provider communication server 120A and not to the service provider communication server 120N. In this embodiment, the bookmark application 108 may store a service provider identifier in the bookmark 109. When a name for the bookmark 109 is detected, the bookmark application 108 determines a service provider communication server 120 based on the service provider identifier in the bookmark 109.

Alternatively, a bookmark 109 may work with multiple service provider communication servers 120A-120N. In this embodiment, the bookmark 109 may have multiple service provider identifiers (i.e., a flag indicating that it will work for any service provider). In this embodiment, the bookmark application 108 may use a bookmark 109 to send a set of commands to multiple service provider communication servers 120 at the same time.

The bookmark 109 may be stored as one or more voice commands received from a user. Alternatively, the bookmark 109 may be stored as text (voice converted to text). In one embodiment, the text may be converted back to voice when the bookmark commands are sent back to the service provider communication server 120.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Web Real-Time Protocol (WebRTC), Integrated Services Digital Network (ISDN), and the like. Thus, the network 110 is an electronic communication network configured to carry messages via packets and/or circuit switched communications.

The service provider communication servers 120A-120N can be or may include any communication servers that can provide communication services (e.g., speech recognition services) from different companies and/or vendors. The service provider communication servers 120A-120N may provide the same types of services and/or completely different services. For example, the service provider communication servers 120A-120N may provide similar services for ordering goods from the service providers (e.g., groceries and household goods). Alternatively, the service provider communication server 120A may provide car purchasing services and the service provider 120N may provide dictionary services.

Figure 2:
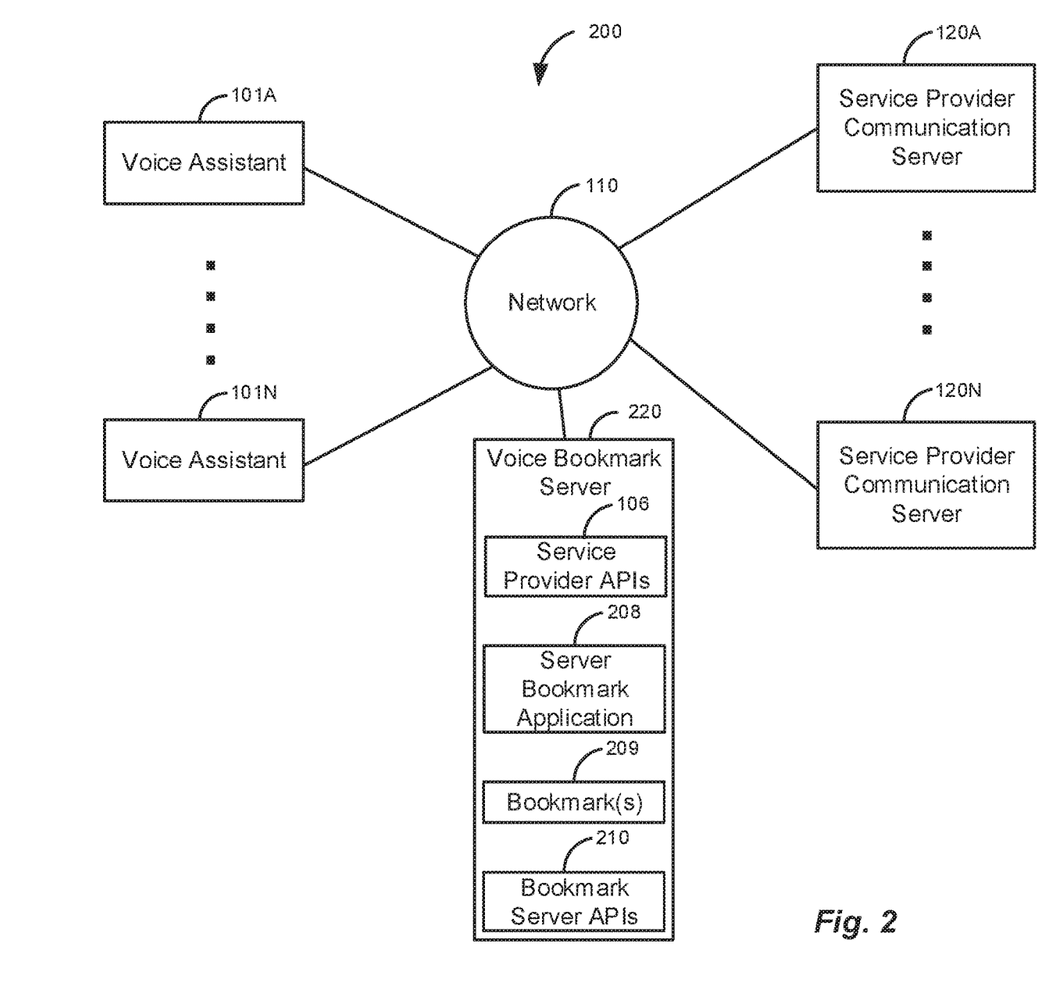
FIG. 2 is a block diagram of a second illustrative system for providing bookmarking services for multiple voice assistants.

FIG. 2 is a block diagram of a second illustrative system 200 for providing bookmarking services for multiple voice assistants 101A-101N. The second illustrative system 200 comprises voice assistants 101A-101N, the network 110, a voice bookmark server 220, and the service provider communication servers 120A-120N.

The voice bookmark server 220 can be or may include any hardware coupled with software that can manage the flow of information between the voice assistants 101A-101N and the service provider communication servers 120A-120N. For example, the voice bookmark server 220 can be inserted into voice communication sessions between the voice assistants 101A-101N and service provider communication servers 120A-120N. Alternatively, the voice bookmark server 220 can be inserted into text streams (voice converted to text) between the voice assistants 101A-101N and the service provider communication servers 120A-120N. In one embodiment, the voice bookmark server may monitor the voice/text streams.

The voice bookmark server 220 further comprises the service provider APIs 106, a server bookmark application 208, bookmark(s) 209, and bookmark server APIs 210. The server bookmark application 208 works similar to the bookmark application 108. However, the server bookmark application 208 manages bookmarks 209 for multiple voice assistants 101A-101N instead of a single voice assistant 101.

The bookmarks 209 are similar to the bookmarks 109 and can work in the same manner as discussed herein for bookmarks 109. However, the bookmarks 209 are bookmarks for multiple voice assistants 101A-101N.

The bookmark server APIs 210 are APIs that allow the bookmark server application 208 to communicate with the voice assistants 101A-101N. The bookmark server APIs 210 allow the bookmark server application 208 send and receive messages from the voice assistants 101A-101N.

Figure 3:
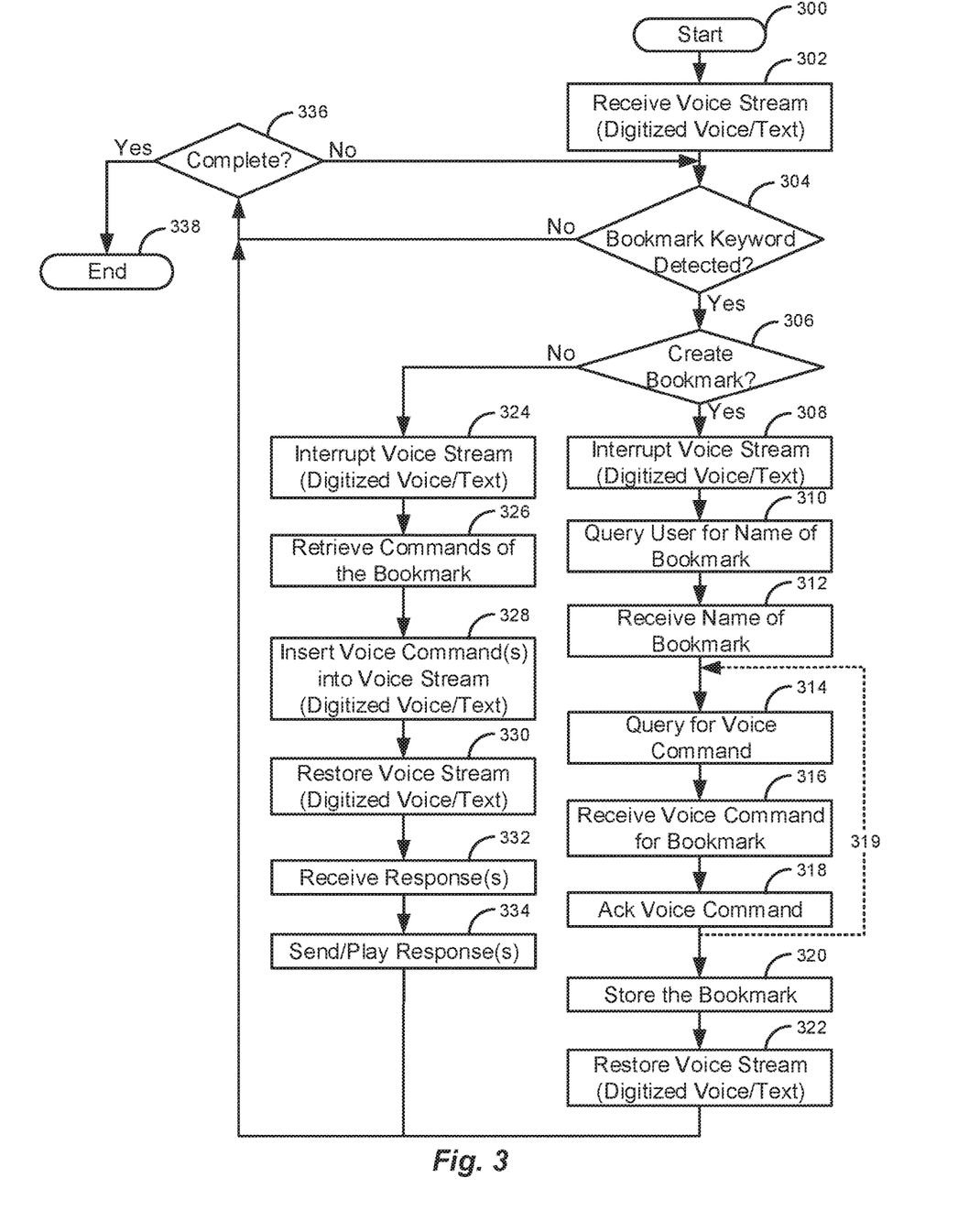
FIG. 3 is a flow diagram of a process for bookmarking complex voice commands.
Figure 4:
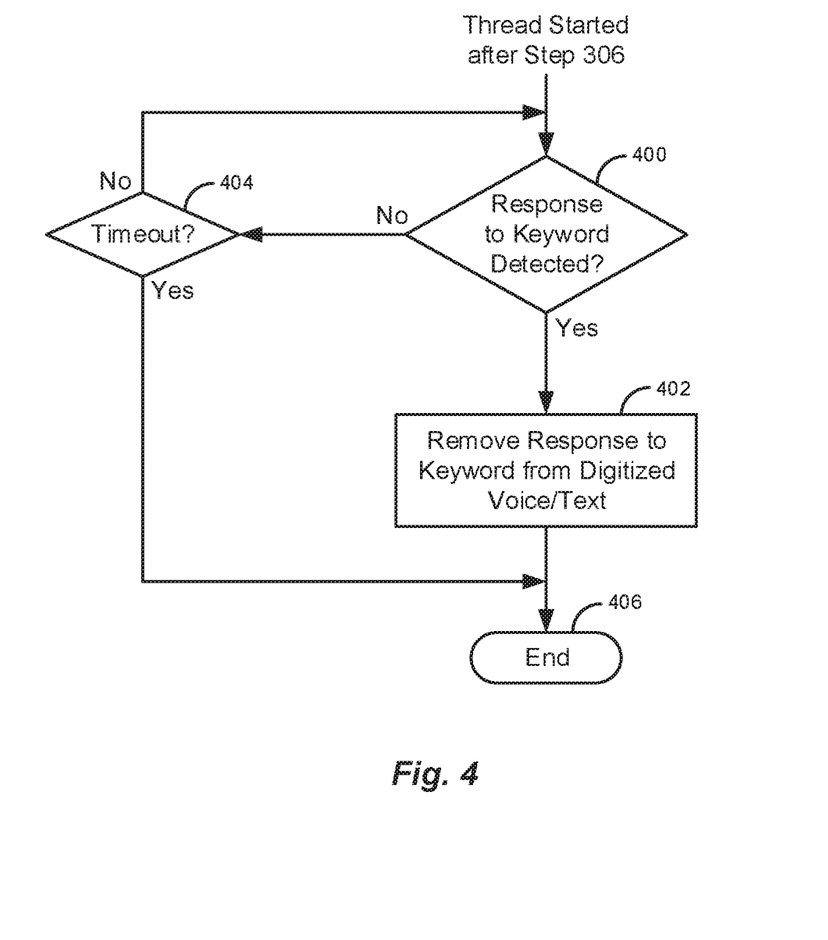
FIG. 4 is a flow diagram of a process removing responses to keywords.

FIG. 3 is a flow diagram of a process for bookmarking complex voice commands. Illustratively, the voice assistants 101A-101N, the codec 105, the service provider APIs 106, the listening application 107, the bookmark application 108, the bookmarks 109, the service provider communication servers 120A-120N, the voice bookmark server 220, the server bookmark application 208, and the bookmarks 209 are stored-program-controlled entities, such as a computer or microprocessor 102, which performs the method of FIGS. 3-4 and the processes described herein by executing program instructions stored in a computer readable storage medium, such as a memory (i.e., a computer memory, a hard disk, and/or the like). Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

The process of FIG. 3 is an illustrative example of where the bookmark application 108/server bookmark application 208 can create and execute bookmarks 109/209. The process of FIG. 3 is a process (e.g., a computer thread that is started) for monitoring and/or being inserted into an individual communication session (e.g., a voice communication session) between a voice assistant 101 and a service provider communication server 120. As one of ordinary skill in the art would understand, the process of FIG. 3 can be duplicated for multiple communication sessions between multiple voice assistants 101A-101N and service provider communication servers 120A-120N as shown in FIG. 2.

In FIG. 3, the bookmark application 108 or server bookmark application 208 (depending on implementation) are inserted into and/or monitor a communication session between the voice assistant 101 and the service provider communication server 120. For example, the listening application 107 may initially setup a voice communication session (or text of the voice) between the voice assistant 101 and the service provider communication server 120. In the embodiment of FIG. 1, the bookmark application 108 is inserted into and/or monitors to the digitized voice stream (and/or converted text) that is received from the codec 105 and then forwards the digitized voice stream and/or converted text to the service provider communication server 120. For FIG. 2, the digitized voice stream (and/or converted text) is received by the server bookmark application 208 from the voice assistant 101 and the forwarded to the service provider communication server 120.

The process starts in step 300. For example, the process of FIG. 3 may start in step 300 when a communication session is established between the voice assistant 101 and a service provider communication server 120. The bookmark application 108/server bookmark application 208 receives a voice stream (e.g., a digitized voice stream and/or text stream of the digitized voice stream) in step 302. The bookmark application 108/server bookmark application 208 determines, in step 304, if a bookmark keyword is detected in the voice stream. The bookmark keyword of step 304 is sent to the server bookmark application 208 via the bookmark server APIs 210. For example, the text or digitized voice stream is sent from the voice assistants 101A-101N using a corresponding bookmark server API on the voice assistants 101A-101N to the server bookmark application 208. The term keyword as used herein, and in the claims, comprises an individual word or a phrase (2 or more words). For example, a keyword can be the phrase "create bookmark." The keyword may be a name of a bookmark 109/209 (e.g. "order Hawaiian pizza").

If a bookmark keyword is not detected in step 304, the process goes to step 336. If the process is complete in step 336, the process ends in step 338. For example, if the communication session between the voice assistant 101 and the service provider communication ends, the process may end in step 338 because there is not a voice stream to monitor. Otherwise, if the process has not ended in step 336, the process goes back to step 304.

The bookmark application 108/server bookmark application 208 may work in different manners in regard to detecting bookmark keywords in the voice stream in step 304. For example, the bookmark application 108/server bookmark application 208 may buffer the voice stream to see if a keyword is in the voice stream. The bookmark application 108/server bookmark application 208 may buffer the voice stream (e.g., for a half second) to see if a specific number of phonemes that match the start of keyword are detected. If the number of phonemes match the start of the keyword, the process continues to buffer the voice stream until a match or a non-match occurs. If there is not a match, the voice stream is passed to the service provider communication server 120. In another embodiment, voice stream is passed until a keyword is fully matched. In this embodiment, the keyword is actually sent to the service provider communication server 120.

If a bookmark keyword is detected in step 304 (e.g., "create bookmark" or a name of a created bookmark), the bookmark application 108/server bookmark application 208 determines, in step 306, if the keyword is to create a bookmark 109/209. For example, if the user at the voice assistant 101 states "create bookmark." If the keyword is to create a bookmark 109/209, the bookmark application 108/server bookmark application 208 interrupts the voice stream (digitized voice and/or text of the digitized voice) in step 308. For example, if there is a voice communication session between the voice assistant 101A and the service provider communication server 120A, the bookmark application 108/server bookmark application 208 interrupts the digitized voice stream being sent from the voice assistant 101A to the service provider communication server 120A in step 308. The interruption is so that the bookmark application 108/server bookmark application 208 can receive input to create/execute a bookmark 109/209. In one embodiment, step 308 is optional. In this embodiment, the bookmark application 108/server bookmark application 208 removes a response by the service provider communication server 120.

The bookmark application 108/server bookmark application 208 queries the user for the name of the bookmark 109 in step 310. For example, the bookmark application 108/server bookmark application 208 may send a digitized voice stream that states to the user "What is the bookmark name?" The bookmark application 108/server bookmark application 208 receives the name of the bookmark 109 in step 312 from the user. For example, the user may say "Order Hawaiian Pizza." The bookmark application 108/server bookmark application 208 queries the user for a voice command associated with the bookmark 109/209 in step 314. For example, the command from the user may be "Order one Hawaiian pizza from Pizza Place, 1121 Neighbor Lane, Dallas, Tex." The bookmark application 108/server bookmark application 208 receives the voice command in step 316 and then acknowledges the voice command in step 318. For example, the bookmark application 108/server bookmark application 208 may say "Command added."

The process of steps 314-318 may optionally be repeated for additional commands as indicated by step 319. The user may be asked if the user wants to enter another command at the end of step 318. For example, the bookmark application 108/server bookmark application 208 may ask if the user "What is the next command, else say exit." If the user wants to speak another command, the process goes back to step 314 and queries the user for a new voice command.

The bookmark 109/209 is then stored in step 320. The bookmark 109/209 may be stored in various ways. For example, the bookmark 109/209 (i.e., the name of the bookmark 109/209/voice command(s)) may be stored as digitized voice using a database structure (where the name of the bookmark 109/209 and each command are stored in separate elements of the database structure). Alternatively, the name of the bookmark/voice command(s) may be stored as text. When the bookmark 109/209 is stored, the name of the bookmark 109/209 is now a keyword that can be detected in step 304.

In one embodiment, the stored bookmark of step 320 may be executed (without the user knowing) to see if the bookmark fails. For example, if the service provider communication server 120 responds to the command of the bookmark 109/209 with "I don't know what that means," the bookmark application 108/server bookmark application 208 may notify the user that the bookmark failed in step 320.

The bookmark application 108/server bookmark application 208 then restores the voice stream from the voice assistant 101 and the service provider communication server 120 so that commands that are destined to the service provider communication server 120 can be processed by the service provider communication server 120. For example, so that commands that are not related to bookmarks 109/209 can be sent to the service provider communication server 120. The process then goes to step 336.

If the keyword in step 306 is not to create a bookmark 109/209 (e.g., the detected keyword is a name of a bookmark 109/209 that was stored in step 320) the bookmark application 108/server bookmark application 208 interrupts the voice stream (digitized voice and/or text of the digitized voice) in step 324 (e.g., like in step 308). The bookmark application 108/server bookmark application 208 retrieves the command(s) associated with the bookmark 109/209 (e.g., the voice commands received in step 316) in step 326. The voice command(s) (e.g., digitized voice or text commands) are inserted into voice stream that is sent to the service provider communication server 120 in step 328. The voice stream from the voice assistant 101 to the service provider communication server 120 is then restored in step 330.

The bookmark application 108/server bookmark application 208 receives the response(s) from the service provider communication server 120 in step 332. For example, if the commands stored in the bookmark 109/209 were "Order one Hawaiian pizza from Pizza Place, 1121 Neighbor Lane, Dallas, Tex." and "what is the expected delivery time for the pizza," the response of step 332 may be "Order has been placed" and "the expected delivery time is 7:00 P.M." In this example, the multiple responses appear as a single response to the single keyword of "Order Hawaiian Pizza." The response is then played (by the bookmark application 108 via speaker 104) or sent to the voice assistant 101 to be played by the speaker 104 in step 334. The process then goes to step 336.

FIG. 4 is a flow diagram of a process for removing responses to keywords. A thread is started after step 306 (after detecting the keyword). In this embodiment, the data for the keyword (e.g., the voice stream) has already been sent to the service provider communication server 120. The bookmark application 108/server bookmark application 208 determines in step if a response to the keyword has been received. For example, the response may be "I don't understand." If a response is not received in step 400, the bookmark application 108/server bookmark application 208 determines in step 404 if a timeout has occurred (e.g., no response is received within a time period). If a timeout has occurred in step 404, the process ends in step 406. Otherwise, if the timeout has not occurred in step 404, the process goes back to step 400.

If a response to the keyword has been received from the service provider communication server 120 in step 400, the bookmark application 108/server bookmark application 208 removes the response to the keyword from the digitized voice stream/text in step 402. The process then ends in step 406.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor 102 or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors 102), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor 102 or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor 102, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein, are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a system, comprising: a microprocessor; a memory; and a computer readable medium, coupled with the microprocessor and comprising microprocessor readable and executable instructions that program the microprocessor to: receive, via a network from a first voice assistant, voice information, wherein the voice information comprises a first digitized voice stream and/or information associated with the first digitized voice stream; identify a first keyword in the voice information, wherein the first keyword is used to create a first bookmark; and in response to identifying the first keyword in the voice information: receive, in the voice information, a name for the first bookmark; receive, in the voice information, a command for the first bookmark; and store the first bookmark in the memory.

Aspects of the above system include wherein the voice information is the first digitized voice stream, wherein the first digitized voice stream is between the first voice assistant and a service provider communication server, wherein the microprocessor readable and executable instructions further program the microprocessor to interrupt the first digitized voice stream from being passed from the first voice assistant to the service provider communication server in response to identifying the first keyword in the first digitized voice stream.

Aspects of the above system include wherein the first keyword is passed in the first digitized voice stream to the service provider communication server and wherein a response to the first keyword sent by the first service provider communication server is removed from the first digitized voice stream.

Aspects of the above system include wherein the voice information is the first digitized voice stream, wherein the first digitized voice stream is between the first voice assistant and a service provider communication server, and wherein the microprocessor readable and executable instructions further program the microprocessor to: identify, in the digitized voice stream, the name of the first bookmark; interrupt the first digitized voice stream from being passed through to the service provider communication server; retrieve the stored first bookmark; and insert the command for the first bookmark into the first digitized voice stream that is passed through to the service provider communication server.

Aspects of the above system include wherein the first bookmark comprises a plurality of commands and wherein the microprocessor readable and executable instructions further program the microprocessor to: identify, in the voice information, the name of the first bookmark; send, the plurality of commands to execute the first bookmark to a service provider communication server; receive a plurality of responses from the service provider communication server; and pass the plurality of responses from the service provider communication server to the first voice assistant.

Aspects of the above system include wherein the plurality of commands are sent using an application programming interface to the service provider communication server and wherein the plurality of responses are tied together to appear as a single response sent to the first voice assistant.

Aspects of the above system include wherein the voice information is the first digitized voice stream, wherein the first digitized voice stream is between the first voice assistant and the service provider communication server, and wherein sending the plurality of commands to execute the first bookmark to the service provider communication server comprises inserting a plurality of separate stored voice commands into the first digitized voice stream that is sent to the service provider communication server.

Aspects of the above system include wherein receiving the voice information, via the network from the first voice assistant comprises receiving the voice information, via the network from a plurality of voice assistants, wherein the voice information from the plurality of voice assistants comprises a plurality of digitized voice streams and/or a plurality of information associated with the plurality of digitized voice streams and wherein identifying the first keyword in the voice information comprises receiving the first keyword in the voice information from the plurality of voice assistants.

Aspects of the above system include wherein the first bookmark is created by a first user at the first voice assistant and wherein the first bookmark can be accessed by a second user at a second voice assistant of the plurality of voice assistants.

Aspects of the above system include wherein the first bookmark comprises a plurality of bookmarks and wherein the first bookmark is associated with a first service provider communication server and wherein a second bookmark of the plurality of bookmarks is associated with a second service provider communication server.

Embodiments include voice assistant comprising: a microprocessor; a microphone; a codec that converts an analog voice stream from the microphone to a digitized voice stream; and a computer readable medium, coupled with the microprocessor and comprising microprocessor readable and executable instructions that program the microprocessor to: identify, based on receiving the digitized voice stream, a first keyword in the digitized voice stream, wherein the first keyword is used to create a first bookmark; and in response to identifying the first keyword in the digitized voice stream: receive, in the digitized voice stream, a name for the first bookmark; receive, in the digitized voice stream, a command for the first bookmark; and store the first bookmark.

Aspects of the above voice assistant include wherein the microprocessor readable and executable instructions further program the microprocessor to: interrupt sending of the digitized voice stream to a service provider communication server.

Aspects of the above voice assistant include wherein the microprocessor readable and executable instructions further program the microprocessor to: identify, in the digitized voice stream, the name of the first bookmark; interrupt the digitized voice stream from being passed through to the service provider communication server; retrieve the stored first bookmark; and insert the command for the first bookmark into the digitized voice stream that is passed through into the service provider communication server.

Aspects of the above voice assistant include wherein the first bookmark comprises a plurality of commands and wherein the microprocessor readable and executable instructions further program the microprocessor to: identify, in the digitized voice stream, the name of the first bookmark; send, the plurality of commands to execute the first bookmark to the service provider communication server; receive a plurality of responses from the service provider communication server; and play the plurality of responses from the service provider communication server to a user.

Aspects of the above voice assistant include wherein the plurality of commands are sent using an application programming interface to the service provider communication server and wherein the plurality of responses are tied together to appear as a single response sent to the voice assistant.

Aspects of the above voice assistant include wherein sending the plurality of commands to execute the first bookmark to the service provider communication server comprises inserting a plurality of separate stored voice commands into the digitized voice stream that is sent to the service provider communication server.

Aspects of the above voice assistant include wherein the first bookmark comprises a plurality of bookmarks and wherein the first bookmark is associated with a first service provider communication server and wherein a second bookmark of the plurality of bookmarks is associated with a second service provider communication server.

Embodiments include a method comprising: receiving, by a microprocessor, a digitized voice stream from a codec that converts an analog voice stream from a microphone to a digitized voice stream; identifying, by the microprocessor and based on receiving the digitized voice stream, a first keyword in the digitized voice stream, wherein the first keyword is used to create a first bookmark; and in response to identifying the first keyword in the digitized voice stream: interrupting, by the microprocessor, sending of the digitized voice stream to a service provider communication server; receiving, by the microprocessor, in the digitized voice stream, a name for the first bookmark; receiving, by the microprocessor, in the digitized voice stream, a command for the first bookmark; and storing, by the microprocessor, the first bookmark.

Aspects of the above method further comprising: identifying, by the microprocessor, in the digitized voice stream, the name of the first bookmark; interrupting, by the microprocessor, the digitized voice stream from being passed through to the service provider communication server; retrieving, by the microprocessor, the stored first bookmark; and inserting, by the microprocessor, the command for the first bookmark into the digitized voice stream that is passed through into the service provider communication server.

Aspects of the above method include wherein the first bookmark comprises a plurality of bookmarks and wherein the first bookmark is associated with a first service provider communication server and wherein a second bookmark of the plurality of bookmarks is associated with a second service provider communication server.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "voice stream" or "as used herein comprise a digitized voice stream and/or a text stream of the digitized voice stream."

What is claimed is:

1. A system, comprising:
a microprocessor;
a memory; and
a computer readable medium, coupled with the microprocessor and comprising microprocessor readable and executable instructions that program the microprocessor to:
receive, via a network from a first voice assistant, voice information, wherein the voice information comprises a first digitized voice stream and/or information associated with the first digitized voice stream;
identify a first keyword in the voice information, wherein the first keyword indicates a first bookmark; and
in response to identifying the first keyword in the voice information:
interrupt the digitized voice stream from being passed through to a service provider communication server;
retrieve the stored first bookmark;
insert one or more commands associated with the first bookmark into the digitized voice stream that is passed through into the service provider communication server;
restore the digitized voice stream to the service provider communication server;
receive one or more responses to the digitized voice stream; and
pass the one or more received responses to the first voice assistant.

2. The system of claim 1, wherein the first keyword is passed in the first digitized voice stream to the service provider communication server and wherein a response to the first keyword sent by the first service provider communication server is removed from the first digitized voice stream.

3. The system of claim 1, wherein the first bookmark comprises a plurality of commands and wherein the microprocessor readable and executable instructions further program the microprocessor to:
identify, in the voice information, the name of the first bookmark;
send, the plurality of commands to execute the first bookmark to a service provider communication server;
receive a plurality of responses from the service provider communication server; and
pass the plurality of responses from the service provider communication server to the first voice assistant.

4. The system of claim 3, wherein the plurality of commands are sent using an application programming interface to the service provider communication server and wherein the plurality of responses are tied together to appear as a single response sent to the first voice assistant.

5. The system of claim 3, wherein the voice information is the first digitized voice stream, wherein the first digitized voice stream is between the first voice assistant and the service provider communication server, and wherein sending the plurality of commands to execute the first bookmark to the service provider communication server comprises inserting a plurality of separate stored voice commands into the first digitized voice stream that is sent to the service provider communication server.

6. The system of claim 1, wherein receiving the voice information, via the network from the first voice assistant comprises receiving the voice information, via the network from a plurality of voice assistants, wherein the voice information from the plurality of voice assistants comprises a plurality of digitized voice streams and/or a plurality of information associated with the plurality of digitized voice streams and wherein identifying the first keyword in the voice information comprises receiving the first keyword in the voice information from the plurality of voice assistants.

7. The system of claim 6, wherein the first bookmark is created by a first user at the first voice assistant and wherein the first bookmark can be accessed by a second user at a second voice assistant of the plurality of voice assistants.

8. The system of claim 1, wherein the first bookmark comprises a plurality of bookmarks and wherein the first bookmark is associated with a first service provider communication server and wherein a second bookmark of the plurality of bookmarks is associated with a second service provider communication server.

9. A voice assistant comprising:
a microprocessor;
a microphone;
a codec that converts an analog voice stream from the microphone to a digitized voice stream; and
a computer readable medium, coupled with the microprocessor and comprising microprocessor readable and executable instructions that program the microprocessor to:
identify, based on receiving the digitized voice stream, a first keyword in the digitized voice stream, wherein the first keyword indicates a name of a first bookmark; and
in response to identifying the first keyword in the digitized voice stream:
interrupt the digitized voice stream from being passed through to a service provider communication server;
retrieve the stored first bookmark;
insert one or more commands associated with the first bookmark into the digitized voice stream that is passed through into the service provider communication server;
restore the digitized voice stream to the service provider communication server;
receive one or more responses to the digitized voice stream; and
play the one or more received responses.

10. The voice assistant of claim 9, wherein the first bookmark comprises a plurality of commands and wherein the microprocessor readable and executable instructions further program the microprocessor to:
identify, in the digitized voice stream, the name of the first bookmark;
send, the plurality of commands to execute the first bookmark to a service provider communication server;
receive a plurality of responses from the service provider communication server; and
play the plurality of responses from the service provider communication server to a user.

11. The voice assistant of claim 10, wherein the plurality of commands are sent using an application programming interface to the service provider communication server and wherein the plurality of responses are tied together to appear as a single response sent to the voice assistant.

12. The voice assistant of claim 10, wherein sending the plurality of commands to execute the first bookmark to the service provider communication server comprises inserting a plurality of separate stored voice commands into the digitized voice stream that is sent to the service provider communication server.

13. The voice assistant of claim 9, wherein the first bookmark comprises a plurality of bookmarks and wherein the first bookmark is associated with a first service provider communication server and wherein a second bookmark of the plurality of bookmarks is associated with a second service provider communication server.

14. A method comprising:
receiving, by a microprocessor, a digitized voice stream from a codec that converts an analog voice stream from a microphone to a digitized voice stream;
identifying, by the microprocessor and based on receiving the digitized voice stream, a first keyword in the digitized voice stream, wherein the first keyword indicates a first bookmark; and
in response to identifying the first keyword in the digitized voice stream:
interrupting, by the microprocessor, sending of the digitized voice stream to a service provider communication server;
retrieving the stored first bookmark;
inserting one or more commands associated with the first bookmark into the digitized voice stream that is passed through into the service provider communication server;
restoring the digitized voice stream to the service provider communication server;
receiving one or more responses to the digitized voice stream; and
playing the one or more received responses.

15. The method of claim 14, wherein the first bookmark comprises a plurality of bookmarks and wherein the first bookmark is associated with a first service provider communication server and wherein a second bookmark of the plurality of bookmarks is associated with a second service provider communication server.

* * * * *